May 14, 1957 E. W. SEEGER 2,792,143
ENCLOSING CASINGS FOR ELECTRICAL CONTROL APPARATUS
Filed Nov. 5, 1954 2 Sheets-Sheet 1
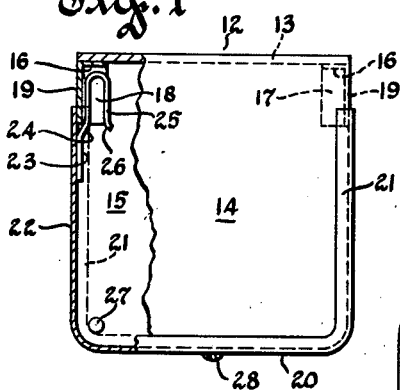
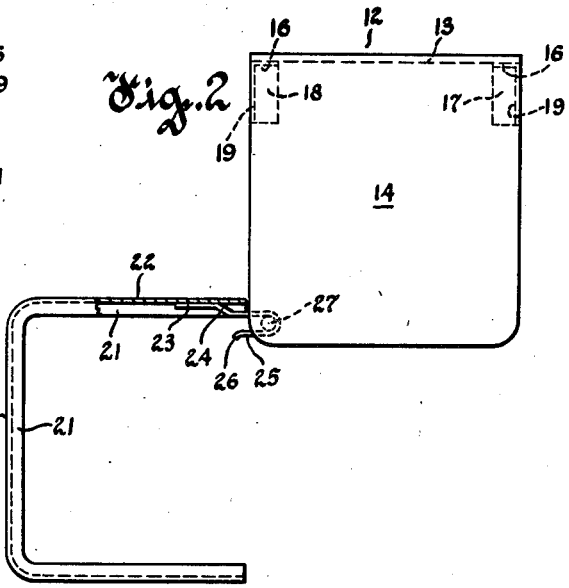
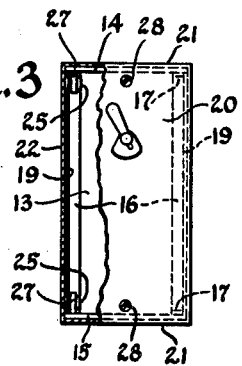
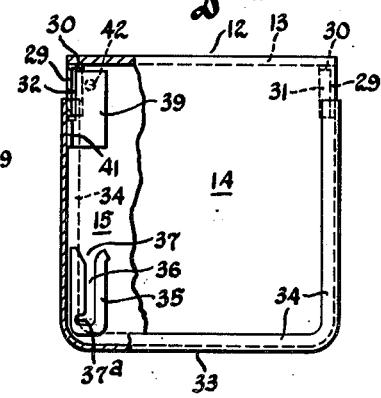
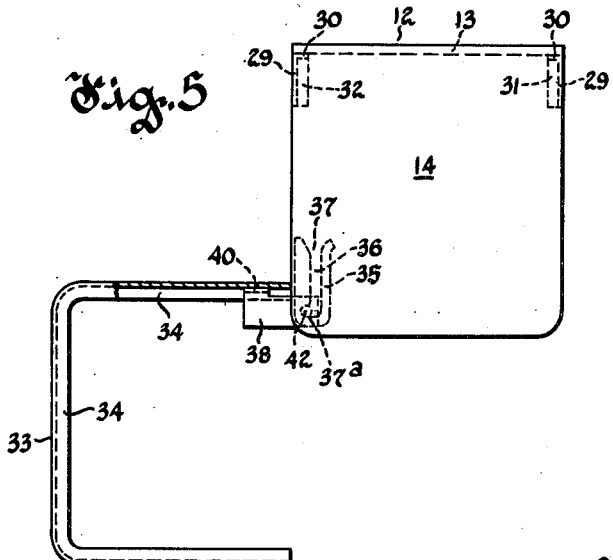
Inventor
Edwin W. Seeger
By W. E. Lyon
Attorney

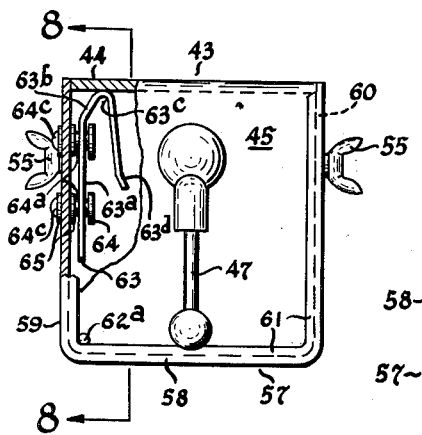
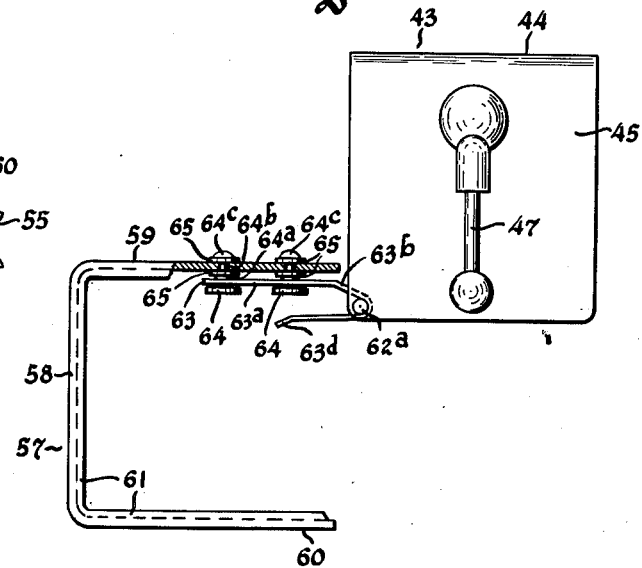
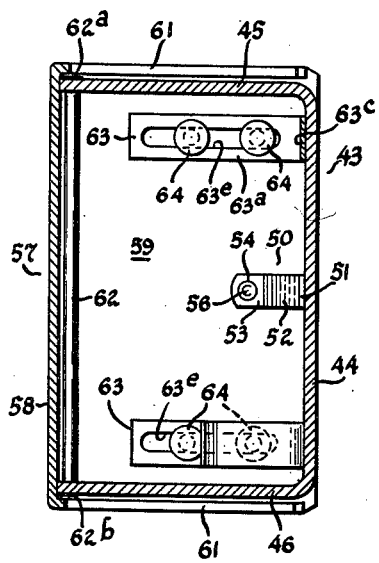
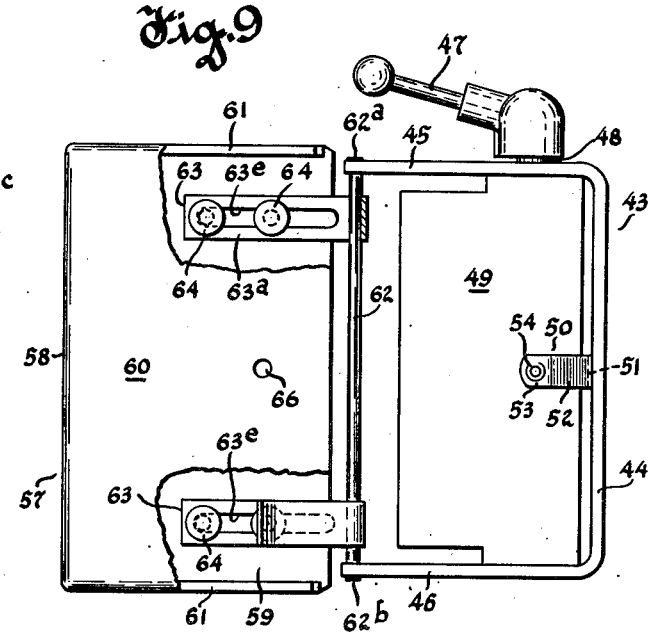

United States Patent Office 2,792,143
Patented May 14, 1957

2,792,143

ENCLOSING CASINGS FOR ELECTRICAL CONTROL APPARATUS

Edwin W. Seeger, Wauwatosa, Wis., assignor to Cutler-Hammer, Inc., Milwaukee, Wis., a corporation of Delaware Application November 5, 1954, Serial No. 467,191

7 Claims. (Cl. 220—4)

This invention relates to improvements in enclosing casings for electrical control apparatus. Although not limited thereto, the present invention is particularly applicable to enclosing casings for motor starters, drum controllers and the like.

In that form of my invention herein disclosed which is adapted to house a drum controller the rear casing section preferably comprises a rectangular sheet metal back plate having a pair of integral parallel forwardly extending substantially rectangular end wall portions; and the cover member comprises a U-shaped member, preferably of substantially thinner gauge sheet metal, which is formed to fit over the end walls and the side edges of said back plate. The front and side walls of the cover member are provided with inwardly bent end portions to overlap and close the lines of engagement of said parts.

In that form of my invention which is adapted to house a motor starter or the like the sheet metal member forming the back plate and end walls may be substantially like the form aforementioned; and in addition a pair of relatively thinner sheet metal plate members are rigidly attached to the inner surface of the back plate and to the inner surfaces of the respective end walls, as by spot welding, to form a portion of the respective side walls of the enclosing casing. Likewise the U-shaped sheet metal cover member is similar to that aforedescribed and is adapted to fit over the major portion of the respective end walls. However, due to the presence of said attached plate members forming parts of the respective side walls of the casing, the side wall portions of the U-shaped cover member need not reach to the full depth of the rear casing section, but will merely exteriorly overlap to some degree the upper end portions of said additional sheet metal members.

As will be appreciated by those skilled in the art, it is desirable that the cover members of such enclosing casings shall be readily openable, to permit inspection of the apparatus enclosed thereby, and to permit cleaning, repairing or replacement of any of the parts of such apparatus. It is likewise desirable in certain installations that upon opening of the cover member it is not possible to readily remove the same; as the cover may be mislaid or lost, with consequent danger to, or loss of time by, the operator attending such control apparatus. However, in other installations there are times when it is desirable to completely remove the cover member, to facilitate servicing of the apparatus enclosed within the casing.

A primary object of this invention is to provide for attainment of the aforementioned desirable results in a simple and efficient manner.

Another object is to provide an effective hinged connection between the cover member and the main or base portion of an enclosing casing of the character herein disclosed, while affording substantially complete access to the parts enclosed within the casing by merely opening the cover.

Another object is to adapt enclosing casings of the character herein disclosed to radically different types of electrical control apparatus.

Another and more specific object is to provide an enclosing casing of the aforementioned character wherein the cover member is normally retained in hinged relationship to the base member upon outward sliding movement of the former relatively to the latter; while nevertheless providing for complete removal of said cover member by a simple manual operation or operations by a person properly instructed with respect thereto.

Another object is to provide an enclosing casing of the aforementioned character which is of simple construction and neat and attractive in appearance.

Another object is to provide an enclosing casing of the character herein contemplated wherein the hinged connection between the cover and the base member is normally effected automatically just prior to complete outward sliding movement of the former with respect to the latter.

A further object is to provide on the cover member a plurality of hook-shaped hinge members, whereby such normally automatically effected hinged connection may be prevented by simply manually temporarily bending one or more of the resilient hinge members to afford clearance between the same and the normally cooperating hinge member or members on the base member.

Another and more specific object is to provide upon the inner surface of one side wall of the cover member a set of slidably mounted hinge members, for enclosing casings wherein the depth of the cover member is substantially equal to the depth of the base member.

Another object is to alternatively provide for use of non-resilient hook-shaped members attached to the inner surfaces of the respective end walls of the base members and cooperatively mounted hinge pins located at opposite ends of the inner face of one side wall of the cover member.

Another object is to alternatively provide resilient hook-shaped hinge members to permit relatively free sliding movement of the cover member onto the base member, during initial assembly of these parts, or after complete removal of the cover from the base, while simultaneously insuring proper relationship of the hinge parts upon subsequent opening movement of the cover.

Another object is to provide removable means to positively prevent accidental sliding movement or displacement of the cover member with respect to the base member after complete assembly of the parts.

Other objects and advantages of the invention will hereinafter appear.

The accompanying drawings illustrate various embodiments of the invention which will now be described, it being understood that the embodiments illustrated are susceptible of modification in respect of certain structural details thereof without departing from the spirit and scope of the invention as defined in the appended claims.

In the drawings, Figure 1 is a top plan view of an enclosing casing, for electrical control apparatus, as constructed in accordance with this invention; the form of casing illustrated being preferred for housing motor starters and the like, although not limited to such use; it being understood that a suitable opening would be provided in the front wall of the cover member, or in one of the end walls of the base member to accommodate an operating handle or shaft, depending upon the type of electrical control apparatus to be housed thereby; the left-hand side of the casing being partly broken away and partly in section to show one of the sets of cooperating hinge elements on the base and cover members of the casing.

Fig. 2 is a view similar to Fig. 1, but showing the cover member in its open hinged position.

Fig. 3 is a front view, on a reduced scale, of a casing like that shown in Figs. 1 and 2, and showing an operating handle attached to the front wall of the cover member.

Fig. 4 is an end elevational view of an enclosing casing similar to that shown in Figs. 1 to 3; but showing a modified form of hinging connection between the cover member and the base member of the casing.

Fig. 5 is a view similar to Fig. 4; but showing the cover member of the enclosing casing in open hinged position.

Fig. 6 is a top plan view, partly broken away, of a form of enclosing casing which is particularly well adapted for use with drum type controllers; the cover member being provided with slidably mounted hinge members, and the end walls having a hinge rod attached thereto and extending therebetween for cooperation with said hinge members.

Fig. 7 is another view of the device of Fig. 6, but showing the cover member in its open, hinged position; and illustrating the degree of sliding movement afforded the hinge members on the cover member.

Fig. 8 is a sectional view, on the line 8—8 of Fig. 6, and

Fig. 9 is a side elevational view of the device shown in Fig. 7, with the cover member of the casing slid outwardly but prior to swinging of said cover member to the position thereof shown in Fig. 7; a drum type controller being shown schematically within the base member, and parts of the cover member being broken away for purposes of illustration.

Referring first to that form of the invention illustrated in Figs. 1, 2 and 3, the numeral 12 designates generally the substantially U-shaped base member of the casing; said base member being preferably punched and stamped to the form illustrated from sheet metal, such as steel, of the desired strength or thickness. Member 12 as thus formed comprises a back portion 13 and opposite parallel end portions 14 and 15 which are integral with said back portion. Said back portion 13 is preferably provided with any desired number, form and arrangement of openings (not shown) to accommodate suitable screws, bolts or other elements for attaching base member 12 to a wall, panel, or other desired support.

Inasmuch as the enclosing casing shown in Figs. 1, 2 and 3 is assumed to be intended to house an electrical control apparatus of the motor starter type (see Fig. 3) the base member 12 has attached to the inner face thereof, and to the inner face of each parallel end portion 14 and 15, as by spot-welding, the bottom flange portion 16, and the end flange portions 17 and 18, respectively, of a pair of like, relatively thin, sheet metal plate members 19, 19, positioned, as best illustrated in Figs. 1 and 2, within the boundaries of the bottom portion 13 and the end portions 14 and 15 of the base member 12.

Consequently the cover member 20 of the enclosing casing need not have a depth coextensive with that of base member 12 (as best illustrated in Fig. 1) to afford complete enclosure of all of the electrical control apparatus to be housed within the casing, except for exposure of the operating handle and a portion of the shaft to which the handle may be attached.

Thus, as shown in Fig. 1, the U-shaped cover member 20 is so formed as to slide inwardly over the side edges of the respective end portions 14 and 15 of base member 12 and into overlapping relationship to the added side plates 19, 19 of said base member. Also the opposite ends of cover member 20 are provided with flanges 21, 21 extending throughout the length of said end portions, to assist in guiding and positioning the cover member with respect to the base member, and to effectively seal the same at the lines of engagement therebetween.

In the enclosing casing illustrated in Figs. 1, 2 and 3 the cover member 20 has attached to the inner surface of the left-hand side wall 22 thereof, as by spot-welding, riveting, or the like (spot-welding being indicated in these figures) a pair of metal hinge members of a material such as sheet steel in the form of strip stock, as indicated. Each of said members is provided with a flat portion 23 which is rigidly attached to the inner surface of the side wall aforementioned, an inwardly offset portion 24 to afford clearance between the same and the adjacent plate member 19 attached to base member 12, and a hook-shaped portion 25, the free end 26 of which is flared outwardly, as best illustrated in Figs. 1 and 3.

Rigidly attached to the respective end portions 14 and 15 of the base member, and extending inwardly toward each other from the inner surfaces of the left-hand outer corners of said end portions are a pair of pivot pins 27, 27 with which the respective hook-shaped portions 25, 25 are adapted to engage, as best illustrated in Fig. 2. The pins 27 are shown as welded to the inner surfaces of the respective end portions of base member 12; but it is to be understood that the same may be attached in any other suitable manner, such as by riveting the same to said end portions of member 12.

It is to be understood that cover member 20 is constrained to move outwardly from base member 12 in a substantially straight line when it is desired to open the enclosing casing for inspection or repair, or replacement of any part or parts, of the electrical control apparatus housed by the casing. The arrangement is therefore such that the hook-shaped portions 25 of the movable hinge elements carried by the cover member 20 will overlap the hinge pins 27 just prior to disengagement of the cover member 20 from the end portions 14 and 15 of the base member. Thus the cover member will remain attached to the base member by reason of the hinge connections, so that the cover may be swung toward the left to the position thereof illustrated in Fig. 2, affording substantiallly complete access to the various parts housed by the casing members.

If for any reason it is desired to completely disconnect the cover member 20 from base 12 this may be readily accomplished by merely making the hinge members (23, 24, 25) of sufficiently thin flexible metal, so that by manually pressing the hook-shaped portions 25 of the movable hinge elements toward that side wall of the cover to which they are attached they will afford clearance for movement of said portions 25 along a line outside of the respective pivot pins 27.

In practice it may be desirable to provide means for retaining the cover member 20 in closed relationship to base member 12. For this purpose the cover 20 may be provided with one or more openings; and in the arrangement illustrated openings are provided in the front wall of the cover member adjacent the upper and lower ends thereof, the respective end portions of the base member 12 having brackets (not shown) attached to the inner surfaces thereof, and said brackets having tapped openings formed therein to accommodate the shanks of securing screws 28, 28, as shown in Figs. 1 and 3.

The modified form of enclosing casing for electrical control apparatus illustrated in Figs. 4 and 5 may be in many respects substantially like that shown in Figs. 1, 2 and 3. Thus the base member 12 of Figs. 4 and 5 comprises a back portion 13 and opposite parallel end portions 14 and 15 formed integrally therewith. The like, relatively thin, sheet metal plate members 29, 29 in Figs. 4 and 5 are of a length to span the distance between the inner surfaces of end portions 14 and 15; but the height thereof and the depth of each bottom flange 30 and of the respective opposite end flanges 31 and 32 are preferably less than the dimensions of the similar elements in the device of Figs. 1 to 3.

The cover member 33 in Figs. 4 and 5 is substantially like the member 20 in Figs. 1 to 3, but is of slightly greater depth, to insure the desired degree of overlap between the same and the side plates 29, 29 attached to base member 12. Cover member 33 is provided with like flanges 34 at opposite ends thereof, to overlap the outer surfaces of end portions 14 and 15 of base member 12.

Attached to the inner surface of each end portion 14 and 15 of base member 12, preferably by spot-welding, is a flat sheet metal punching 35 of substantial thickness. Each punching 35 is provided with a slot comprising a straight portion 36, a flared open end 37, and a closed end 37ª offset toward the adjacent side edge of the end portion 14 or 15 to which it is attached; said slots being alined with each other lengthwise of the enclosing casing.

Also attached to the inner surface of the corresponding side wall of cover 33 adjacent to each longitudinally spaced end thereof are a pair of sheet metal bracket members 38 and 39, which are preferably formed from like flat substantially L-shaped punchings, the ends of the respective base portions of said L's being bent in opposite directions relatively to each other; one of said rectangular ends being indicated in dotted lines and designated by the numeral 40 in Fig. 5, and the other being shown in full lines at 41 in Fig. 4; it being understood that said ends are positioned so as to extend toward each other; and said ends being spaced inwardly from the opposite end flanges 34, 34, respectively, of cover member 33 to afford clearance between the same and the respective end portions 14 and 15 of base member 12.

Each bracket member 38 and 39 has rigidly attached to the face thereof respectively adjacent the end walls 14 and 15 of base member 12 a pin or stud, as shown in dotted lines at 42 in Figs. 4 and 5. Said studs are rigidly attached at one end thereof to the brackets in any suitable manner, as by spot welding, as indicated, or by a riveting operation or the like.

As will be understood, the studs are so positioned within the enclosure that upon outward sliding manual movement of cover 33 with respect to base member 12 the pins or studs 42, 42 will automatically move into the slots 36 provided in the aforementioned members 35 attached to the inner faces of end walls 14 and 15 to limit the extent of straight line outward movement of cover 33 with respect to base member 12. At this point, however, the cover is freed for pivotal movement to the position thereof illustrated in Fig. 5, the offset inner ends 37ª of slots 36 cooperating to permit complete exposure of the front face of housing member 12 and the electrical control apparatus carried thereby.

In this form of the invention if it is desired to provide for complete removal of cover member 33 from base member 12 the bracket members 38 and 39 should be made sufficiently resilient or flexible to provide for manually pressing the same toward each other to effect disengagement of pins 42, 42 from the slots 36. In fact it would then only be necessary to press inwardly on either one of the members 38 and 39 so as to free one end of cover 33, whereupon the other pin may be disengaged from its cooperating slot by a slightly angled endwise manual movement of cover member 33 with respect to base member 12.

In practice the cover 33 and base member 12 are preferably provided with screw and bracket means to positively restrain the cover against accidental displacement thereof from the base member, as shown at 28, 28 in Fig. 3 aforedescribed.

In that form of the invention illustrated in Figs. 6 to 9, inclusive, the enclosing casing is shown as adapted to house a drum type electrical control apparatus; but it will be apparent to those skilled in the art that the casing per se is readily adaptable for housing other forms of electrical control apparatus.

Here, as in the devices aforedescribed, the U-shaped base member 43 of the casing comprises a rear wall 44 and a pair of suitably spaced, preferably parallel, end walls 45 and 46; it being understood that if the rear wall 44 is attached in any well known manner to a vertical wall or panel (not shown) the wall 45 may be either the upper or lower end wall of base member 43. Obviously any one of the three walls 44, 45 or 46 may be horizontally mounted upon a suitable pedestal or base; in which event it is only necessary to provide a suitably located opening to accommodate the shaft or stud to be associated with the manually operable handle of the controller.

In Figs. 6, 7 and 9 the numeral 47 designates an oscillatable handle of suitable form, which is non-rotatably attached in any suitable manner, as by a set screw or screws (not shown) to the rotatable shaft 48 (see Fig. 9) of a drum type controller positioned within and attached to the walls of base member 43, and shown in diagrammatic outline at 49 in Fig. 9.

Attached to the inner surface of the rear wall 44 of base member 43 are a pair of like resilient brackets 50 which are reversely arranged as follows: The base portions 51 of said brackets are spot-welded, or otherwise rigidly attached, at suitably spaced points to the inner surface of wall 44; each bracket has an upwardly and outwardly angled intermediate portion 52, and an upstanding end portion 53, which is substantially parallel to, but slightly spaced inwardly from the respectively adjacent side edge of said rear wall 44 of base member 43; and each end portion 53 is provided with a tapped opening at 54, which openings are adapted to receive the shanks (not shown) of a pair of thumb-operated screws, the heads 55, 55 of which are shown in Fig. 6, and the shank end of one of which screws is indicated at 56 in Fig. 8. In this connection it should be noted that in the fragmentary cross-sectioned portion of Fig. 6 the bracket 50 and the screw shank 56 (Fig. 8) cooperating with said bracket are omitted, to clarify the illustration of the hinge members of the enclosing casing.

Inasmuch as the cover member 57 in the enclosing casing of Figs. 6 to 9, inclusive, is adapted to extend throughout the entire depth of base member 43 it is unnecessary to provide the latter with added side plates, such as shown at 19 in Figs. 1 to 3, inclusive, and at 29 in Figs. 4 and 5.

The inverted U-shaped cover member 57 includes the front wall 58 and the substantially parallel side walls 59 and 60. As best illustrated in Figs. 6 and 8, the side walls 59 and 60 extend throughout the full depth of base member 43; and the front and side walls 58, 59 and 60 have inwardly bent end portions to provide like end flanges 61, 61 at opposite ends of the enclosing casing.

To provide a hinged connection of cover 57 to base member 43, the end walls 45 and 46 are provided with alined openings, at one outer corner portion of each, to jointly receive a metal rod 62 of circular cross section and of predetermined length; and after assembly of rod 62 with said end walls the slightly projecting ends of said rod are upset or riveted over the outer surfaces of the respective end walls 45 and 46, as indicated at 62ª and 62ᵇ, to permanently retain the rod in assembled position.

For cooperation with the rod 62 to afford support for cover 57 after outward sliding and subsequent pivotal movement thereof with respect to base member 43, as shown in Fig. 7, a pair of hook-shaped metal hinge members 63, 63 are provided. Each member 63 preferably comprises a straight portion 63ª, an inwardly angled portion 63ᵇ, a curved portion 63ᶜ to be engaged with rod 62 to limit outward sliding movement of cover 57 with respect to base member 43, and a further inwardly angled and flared free end portion 63ᵈ, which acts to normally insure proper cooperative engagement of each member 63 with said rod 62.

As best illustrated in Figs. 8 and 9, the straight portion 63ª of each hinge member 63 is provided with a relatively long straight-sided slot or opening 63ᵉ; a pair of headed pins 64, 64 being attached to the side wall 59 of the cover member; and said pins having shank portions 64ª which act jointly to limit sliding movement of members 63 to a substantially straight line. Each pin 64 has a reduced shank portion 64ᵇ which penetrates openings of corresponding size in the inner washer 65, the side wall 59 of said cover member, and an outer washer 65, and is upset over the latter, as best illustrated at 64ᶜ in Fig. 7, to permanently retain said movable hinge parts in assembled relation.

As shown in Fig. 6 the hinge members 63 are free to move toward the front wall of cover member 57 after the same come into engagement with the rear wall 44 of base member 43. Conversely, said hinge members 63 are free to slidably move outwardly beyond the lower edge of the side wall 59 of cover member 57, upon full outward sliding movement of said cover member with respect to base member 43 (see Fig. 9), thereby affording clearance of said cover member with respect to the base member, to permit pivotal movement of the former to the position thereof shown in Fig. 7.

If it is desired to provide for complete removal of cover member 57 from base member 43, the hinge members 63 may be composed of metal of sufficient flexibility or resiliency to facilitate manual compressing toward the left (Fig. 6) of one or both of the free end portions 63ᵈ of hinge members 63 just before said free end portions come in contact with hinge rod 62, thus affording sliding clearance between the same and said rod. If both of the free end portions 63ᵈ could be thus compressed it is only necessary to continue the outward sliding movement of cover member 20 to effect complete disengagement thereof from base member 12. If, however, only one of the free end portions 63ᵈ is thus compressed the resilient hinge member of which it formed a part may be completely disengaged from rod 62, and the freed end of the cover member then tilted upwardly, and then slid endwise until the remaining hinged end thereof clears the corresponding end wall of base member 12, whereupon said hinged end may be tilted downwardly and then moved laterally in a direction to effect complete disconnection of the other hook-shaped movable hinge member.

As aforeindicated upon complete sliding closure of cover member 57 with respect to base member 43 the pair of threaded shanks (see 56, Fig. 8) of thumb screws 55 may be inserted through openings in the opposite side walls 59 and 60 of cover member 57 (one of said openings being shown at 66 in Fig. 9), and into threaded engagement with the openings 54 in brackets 50 to positively retain cover 57 in assembled relationship to base member 43; said thumb screws 55 being readily removable manually when it is desired to open the enclosing casing.

I claim:

1. In an enclosing casing for electrical control apparatus, in combination, a sheet metal base member comprising a rear wall, a pair of spaced, relatively high, parallel end walls, and a pair of relatively lower parallel side walls, a cover member comprising a front wall and a pair of spaced substantially parallel side walls, said last mentioned side walls being of less depth than the end walls of said base member but of sufficient depth to at least slightly overlap the upper edges of said side walls of said base member, said base and cover members being of the type adapted for assembly and disassembly by straight line telescopic inward and outward movements of the latter with respect to the former, said cover member being provided adjacent the inner end of one side wall thereof with a pair of hinge elements, said base member having rigidly attached to and extending inwardly from the inner upper corner surfaces of the respective end walls a pair of alined hinge elements for cooperative engagement by said hinge elements first mentioned upon telescopic outward movement of said cover member, all of said hinge elements acting jointly to normally prevent complete disengagement of said cover member from said base member while affording hinged movement of said cover member to and support thereof in open position by said base member.

2. In an enclosing casing for electrical control apparatus, in combination, a sheet metal base member comprising a rear wall and a pair of spaced parallel end walls formed integrally therewith, a sheet metal cover member comprising a front wall and a pair of spaced substantially parallel side walls formed integrally therewith, the front and side walls of said cover member having flange portions bent inwardly at right angles thereto to engage and overlap the outer surfaces of the respective end walls of said base member to guide and facilitate proper telescopic movement of said cover member and said base member into assembled relationship to each other and to effectively close the lines of engagement therebetween, stationary hinge means attached to the respective end walls of said base member and projecting inwardly from the respective inner surfaces of said end walls at alined outer corners thereof, a plurality of hinge members attached to the inner surface of one side wall of said cover member for pivotal engagement with said stationary hinge means upon outward telescopic movement of said cover member with respect to said base member, to thereby normally insure against complete disengagement of said cover member from said base member, and means affording a resilient support for each of the hinge members attached to said cover member, whereby upon partial outward movement of said cover member from said base member all or certain of said resilient supports may be manually deformed to facilitate complete separation of said cover member from said base member when required.

3. An enclosing casing for electrical control apparatus comprising, in combination, a sheet metal base member comprising a rear wall, a pair of spaced, relatively high, parallel end walls, and a pair of relatively lower parallel side walls, a sheet metal cover member comprising a front wall and a pair of spaced substantially parallel side walls, said last mentioned walls being of less depth than the end walls of said base member but of sufficient depth to at least slightly overlap the upper edges of said side walls of said base member, said base and cover members being of the type adapted for assembly and disassembly by straight line telescopic inward and outward movements of said cover member with respect to said base member, said cover member being provided adjacent the inner end of one side wall thereof with a plurality of resiliently mounted hinge elements, said base member having rigidly attached to and extending inwardly from the inner surface of each end wall a corresponding number of hinge elements for cooperative engagement by said hinge elements first mentioned upon telescopic outward movement of said cover member, all of said hinge elements acting jointly to normally prevent complete disengagement of said cover member from said base member while affording hinged movement of said cover member and support thereof in open position by said base member, and one or more of said resiliently mounted hinge elements being manually operable at will to avoid cooperative engagement thereof with the corresponding hinge element or elements on said base member to provide for complete disconnection of said cover member from said base member.

4. In an enclosing casing for electrical control apparatus, in combination, a sheet metal base member comprising a rear wall, a pair of spaced, relatively high parallel end walls, and a pair of relatively lower parallel side walls, a one-piece sheet metal cover member comprising a front wall and a pair of spaced substantially parallel side walls, said last mentioned side walls being of less depth than the end walls of said base member but of sufficient depth to at least slightly overlap the upper edges of said side walls of said base member, said base and cover members being of the type adapted for assembly and disassembly by straight line telescopic inward and outward movements of the latter with respect to the former, said cover member being provided adjacent the inner end of one side wall thereof with a plurality of resiliently mounted hinge elements, said base member having rigidly attached to and extending inwardly from the inner surface of each end wall a corresponding number of hinge elements for cooperative engagement by said hinge elements first mentioned upon telescopic outward movement of said cover member, all of said hinge elements acting jointly to normally prevent complete disengagement of said cover member from said base member while affording hinged movement of said cover member to and support thereof in open position by said base member, one or more of said resiliently mounted hinge elements being manually operable at will to avoid cooperative engagement thereof with the corresponding hinge elements on said base member to provide for complete disconnection of said cover member from said base member if required, and said resiliently mounted hinge elements also providing for relatively free telescopic movement of said cover member into completely closed relationship to said base member either initially or after manual disassembly of said members in the manner aforementioned.

5. An enclosing casing for electrical control apparatus comprising, in combination, a metal base member comprising a rear wall and a pair of spaced parallel end walls, a metal cover member comprising a front wall and a pair of spaced substantially parallel side walls, the opposite end portions of the respective front and side walls of said cover member being bent inwardly at substantially a right angle thereto to provide relatively narrow opposite end flanges therefor, whereby said cover member is limited to substantially straight-line telescopic movement relatively to said base member throughout the major portion of its travel for closing or opening said casing at will, said cover member being provided at one side of its inner end with a plurality of hook-shaped hinge elements, said base member having attached thereto at least one hinge element for cooperative engagement with said hinge elements first mentioned, and all of said hinge elements acting jointly to normally prevent complete disengagement of said cover member from said base member while affording hinged movement of said cover member and support thereof by said base member.

6. An enclosing casing for electrical control apparatus comprising, in combination, a metal base member comprising a rear wall and a pair of spaced parallel end walls, a metal cover member comprising a front wall and a pair of spaced substantially parallel side walls, the opposite end portions of the respective front and side walls of said cover member being bent inwardly at substantially a right angle thereto to provide relatively narrow opposite end flanges therefor, whereby said cover member is limited to substantially straight-line telescopic movement relatively to said base member throughout the major portion of its travel for closing or opening said casing at will, said cover member being provided at the inner end of one side wall thereof with a plurality of hook-shaped hinge elements, said base member having attached thereto at least one hinge element for cooperative engagement with said hinge elements first mentioned, all of said hinge elements acting jointly to normally prevent complete disengagement of said cover member from said base member while affording hinged movement and support of the former by the latter, and said flanges on said cover member overlapping the lines of engagement of the side walls of said cover member with the end walls of said base member to effectively close said casing.

7. In an enclosing casing for electrical control apparatus, in combination, a sheet metal base member comprising a rear wall and a pair of spaced parallel end walls formed integrally therewith, a sheet metal cover member comprising a front wall and a pair of spaced substantially parallel side walls formed integrally therewith, the front and side walls of said cover member having flange portions bent inwardly at right angles thereto to engage and overlap the outer surfaces of the respective end walls of said base member to guide and facilitate proper telescopic movement of said cover member and said base member into and out of assembled relationship to each other and to effectively close the lines of engagement therebetween, stationary hinge means attached to the respective end walls of said base member and projecting inwardly from the respective inner surfaces of said end walls adjacent one pair of alined outer corners thereof, and a plurality of hinge members attached to the inner surface on one side wall of said cover member and arranged for automatic pivotal engagement with said stationary hinge means upon outward telescopic movement of said cover member with respect to said base member, to thereby normally insure against complete disengagement of said cover member from said base member, said pivotal engagement of said cover member with said base member affording proper support of said cover member while permitting complete exposure of the front of said base member to facilitate repair or replacement of the electrical control parts carried by the latter.

References Cited in the file of this patent

UNITED STATES PATENTS

| | | |
|---|---|---|
| 1,461,336 | Weide | July 10, 1923 |
| 1,481,415 | Casper | Jan. 22, 1924 |
| 1,877,468 | L'enfant | Sept. 13, 1932 |
| 2,215,607 | Eastwood | Sept. 24, 1940 |
| 2,273,455 | Whitman et al. | Feb. 17, 1942 |
| 2,420,184 | Mekelbury | May 6, 1947 |